United States Patent [19]

Somers

[11] Patent Number: 4,614,037
[45] Date of Patent: Sep. 30, 1986

[54] ACCESSORY STORAGE DEVICE FOR ELECTRIC JIGSAW

[75] Inventor: Robert I. Somers, Raleigh, N.C.
[73] Assignee: Black & Decker, Inc., Newark, Del.
[21] Appl. No.: 639,406
[22] Filed: Aug. 10, 1984
[51] Int. Cl.$^4$ .......................................... B27B 19/09
[52] U.S. Cl. ..................................... 30/392; 30/125; 7/167
[58] Field of Search ............... 30/392, 393, 394, 125; 145/63, 64; 81/490; 7/167

[56] References Cited

U.S. PATENT DOCUMENTS

| | | | |
|---|---|---|---|
| 273,621 | 3/1883 | Small | 7/167 |
| 516,294 | 3/1894 | Britton | 81/490 |
| 1,647,396 | 11/1927 | Decker | 408/241 |
| 2,588,162 | 3/1952 | Riggio | 81/490 |
| 2,696,294 | 12/1954 | Tarnay | 7/167 |
| 3,353,573 | 11/1967 | Hitzeroth | 30/125 |
| 3,405,749 | 10/1968 | Butler | 7/167 |
| 3,603,782 | 9/1971 | Wortmann | 30/125 X |
| 4,240,771 | 12/1980 | Derbyshire | 408/241 |
| 4,361,956 | 12/1982 | Kirk | 30/392 |

FOREIGN PATENT DOCUMENTS 1170968 11/1969 United Kingdom .

OTHER PUBLICATIONS

Black & Decker Power Tools Catalogue, 1984, pp. 8, 44.

*Primary Examiner*—Jimmy C. Peters
*Attorney, Agent, or Firm*—Finnegan, Henderson, Farabow, Garrett & Dunner

[57] ABSTRACT

An electric jigsaw includes a motor housing, a shoe having a pivot arch and a shoe plate, the arch securing the shoe plate to the jigsaw housing for relative pivotal movement of the housing and shoe plate about the longitudinal axis of the arch. The improvement comprises an axial cavity defined by the arch and the shoe plate, and a plug removably disposed in one end of the cavity, the plug including a plurality of axially-extending slots open at one end thereof for removably receiving attachments for the saw.

6 Claims, 7 Drawing Figures 4,614,037

ACCESSORY STORAGE DEVICE FOR ELECTRIC JIGSAW

BACKGROUND OF INVENTION

1. Field of the Invention

The present invention relates to an electric jigsaw, and in particular, to a storage device for accessories such as blades for the electric jigsaw.

2. Description of Relevant Information

One of the requirements for use of an electric jigsaw is the ability to change the cutting blade removably secured in the reciprocating shaft of the saw. In such conventional jigsaws, a screwdriver or wrench is used to release a screw on the end of the reciprocating shaft and a blade is inserted into the end of the shaft. The screw is then tightened to secure the blade in position.

During use of an electric jigsaw, blades frequently break. Also, depending upon the nature of the work being performed with the jigsaw, different blades are required at different times. For example, an initial cut might be done with a rough cutting blade and subsequent finishing cutting done with a finer blade. Also, in the same project, material of different types might be cut, such as wood, plastic or metal. Each type of material requires a different blade. It may also be necessary to have blades of different lengths, depending upon the thickness of the material being cut.

Because of the frequent necessity to change blades in an electric jigsaw, a supply of blades and a tool for releasing the screw securing the blade in position must be at hand. This frequently presents a problem, particularly where the work is being performed away from the location at which spare blades and toools are kept.

It is the object of the subject invention to provide a means for storing additional blades and/or a screwdriving device on the jigsaw itself, thereby permitting easy removal and replacement of blades at the site of the work.

SUMMARY OF THE INVENTION

The objects and advantages of the invention may be realized and obtained by means of the instrumentalities and combinations particularly pointed out in the appended claims.

The invention in its broadest form may be practiced by having a holder which removably receives attachments for use with the saw and is removably attached to the saw at any convenient location.

In a preferred embodiment, an electric jigsaw includes a motor housing, an arch and a shoe plate, the arch being secured to the shoe plate and securing the shoe plate to the housing for relative pivotal movement of the housing and plate about the longitudinal axis of the arch. The invention, as embodied and described herein, comprises an axial cavity defined by the arch and the shoe plate and a plug removably disposed in one end of the cavity, the plug including a plurality of axially-extending slots open at one end thereof for removably receiving attachments for the saw.

Preferably the plug is formed of a resilient material such as elastomeric polymer.

It may be perferred that the axial slots be open at one end and closed at the opposite end and the attachments for the saw disposed in the solts extend beyond the open end thereof and into the axial cavity.

Also in accordance with the invention, as embodied and broadly described herein, a holder of blades for an electric jigsaw having a motor housing and a shoe plate comprises a plug having an axis and having one end thereof shaped for removable insertion into a cavity in the jigsaw and the plug including at least one axially-extending slot open at the one end for removably receiving a blade for the jigsaw.

Preferably the holder includes a plurality of axially extending slots, each being open at the one end and closed at the other end. It may be preferred that the holder include a screwdriving device and a plurality of saw blades disposed in the axial slots.

BRIEF DESCRIPTION OF THE DRAWINGS

The accompanying drawings which are incorporated in and constitute a part of the specification, illustrate an embodiment of the invention, and together with the description, serve to explain the principles of the invention.

DETAILED DESCRIPTION OF PREFERRED EMBODIMENTS

Reference will now be made in detail to the present preferred embodiments of the invention, examples of which are illustrated in the accompanying drawings.

Figure 1:
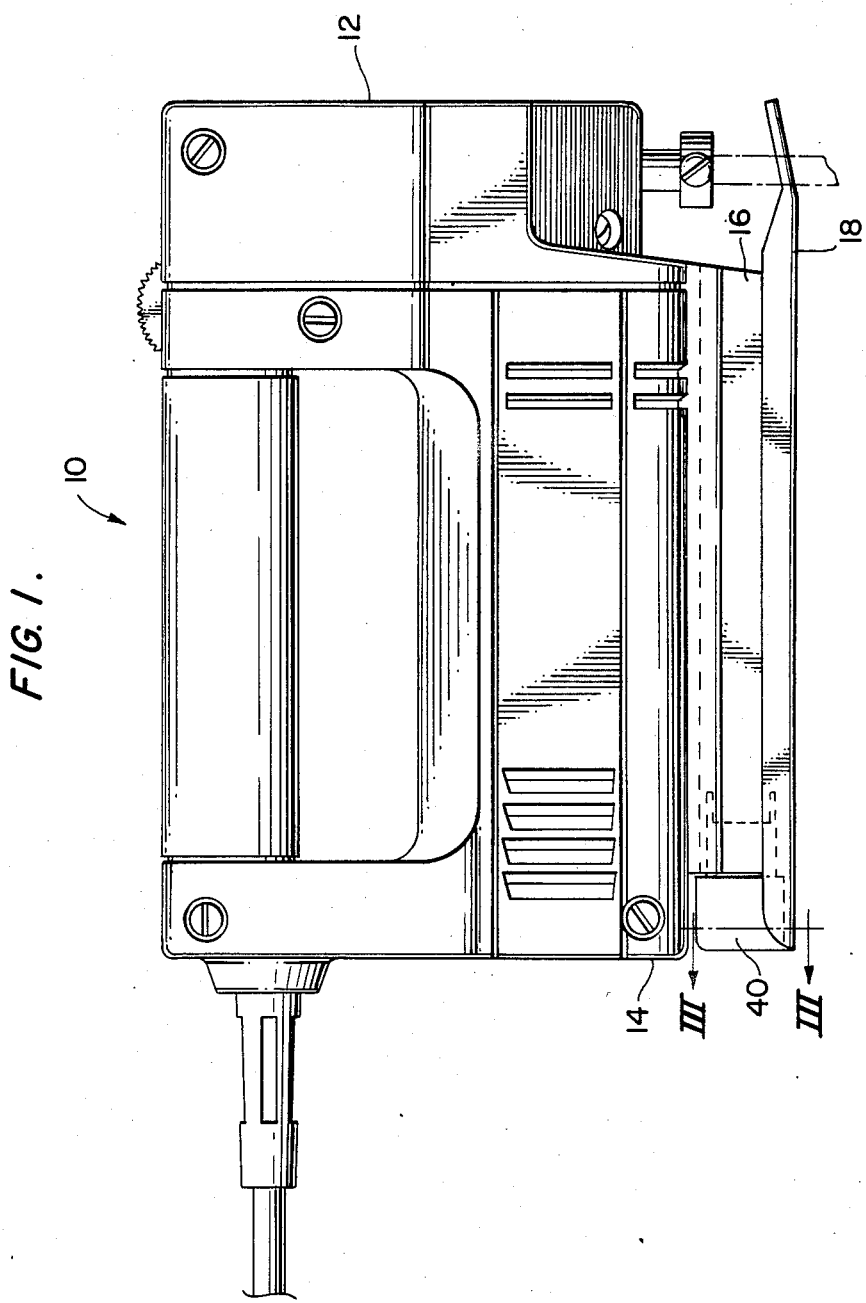
FIG. 1 is a side view of a jigsaw incorporating an embodiment of the invention.
Figure 2:
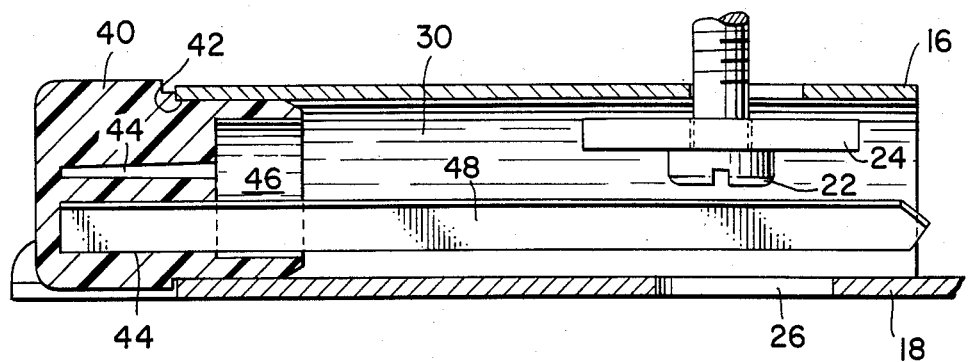
FIG. 2 is a partial cutaway view of the shoe and shoe plate shown in FIG. 1.
Figure 3:
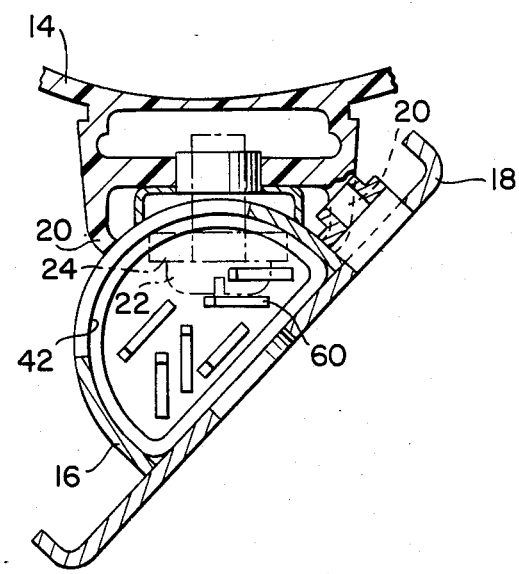
FIG. 3 is a cross-sectional view taken along line III—III in FIG. 1.

In accordance with the invention, an electric jigsaw comprises a motor housing, a shoe including a pivot arch and a shoe plate, the arch being secured to the shoe plate and securing the shoe plate to the housing for pivotal movement about the longitudinal axis of the arch. As seen in FIGS. 1, 2 and 3, the jigsaw 10 includes a motor housing 12 having a base 14, and a shoe 15 which includes a pivot arch 16 and a shoe plate 18. As best seen in FIG. 3, the arch 16 has a generally C-shaped cross-section which is preferably integrally secured to shoe plate 18. Arch 16 supports shoe plate 18 on base 14 of housing 12 such that housing 12 may be pivotally moved about the longitudinal axis of arch 16. Although various methods may be used for mounting the shoe plate and arch to the housing, as depicted in FIG. 3, members 20 depend from base 14 of housing 12 to generally engage the outside surface of arch 16. A screw 22 and clamping plate 24 or similar structure releasably engages the inside surface of arch 16 to hold shoe plate 18 in a selected angular position with respect to housing 12. Access to screw 22 is obtained through opening 26 in shoe plate 18.

In accordance with the invention, an axial cavity is defined by the arch and the shoe plate. In the embodiment depicted in FIGS. 2 and 3, shoe 15 including the arch and shoe plate 18 cooperate to define an axial cavity 30. The cavity 30 extends the full axial length of shoe 15 between the front and rear ends of housing 12. The cavity 30 is partially interrupted by the structure for releasably securing the shoe plate in various angular positions.

In accordance with the invention, a plug is removably disposed in one end of the cavity, the plug including a plurality of axially-extending slots open at one end thereof for removably receiving attachments for the saw.

As embodied herein, plug 40 is removably disposed in the rear end 42 of cavity 30. Plug 40 includes a plurality of axially extending slots 44 open at one end 46 for removably receiving attachments 48 for the saw.

Preferably the plug 40 is made of a resilient material such as an elastomeric polymer.

Figure 4:
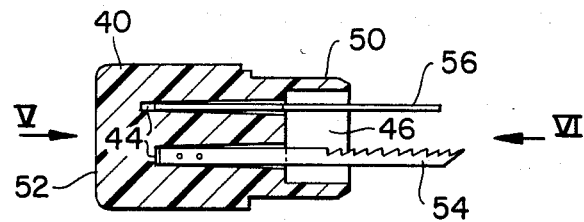
FIG. 4 is a cross-sectional view of the holder of the invention.
Figure 5:
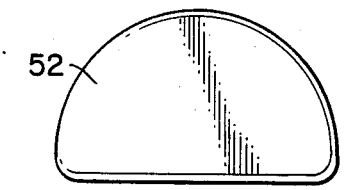
FIG. 5 is a end view of the device in FIG. 4.
Figure 6:
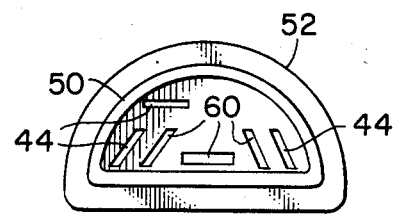
FIG. 6 is an end view of the device in FIG. 4 with the accessories removed.

The subject invention is also directed to a holder of blades for an electric jigsaw which constitutes plug 40. As seen in FIGS. 4–6, plug 40 has one end 50 shaped for removable insertion into a cavity in any convenient location in the jigsaw. Preferably, the one end 50 of plug 40 has a generally D-shaped cross-section and is frictionally retained in cavity 30 of shoe 15 which has a complementary D-shaped cross-section as seen in FIG. 3.

Preferably the other end 52 of plug 40 is closed and also has a D-shaped cross-section (FIG. 5).

Plug 40 includes at least one axially-extending slot 44 open at one end 46 and closed at the other end. Slots 44 are generally tapered toward the closed end to frictionally secure in the slots attachments such as blades 54, screw-driving device 56 or other tools for use with the jigsaw.

The location of axial slots 44 are selected to provide at least one slot capable of receiving an extra long blade. Thus, the slot arrangement depicted in FIG. 6 provides slots 60 so arranged that a blade extending from slot 60 will not contact the structure pivotally securing shoe plate 18 to base 14 when shoe plate 18 is pivoted to its full extent in one direction or the other. Thus slots 60 will accommodate blades at least as long as the axial length of arch 16. The operation of this structure may be seen in FIG. 3 wherein slot 60 is not obstructed by screw 22, despite the full rotation of shoe plate 18 and thus may accommodate a blade as long as blade 48 depicted in FIG. 2.

Figure 7:
FIG. 7 is a side view of screw-driving device.

Plug 40 may also accommodate in at least one slot thereof a screw-driving device usable to remove and replace blades in the jigsaw. An exemplary type of screw-driving device 56 is depicted in FIG. 7.

It will be apparent to those skilled in the art that various modifications and variations could be made in the jigsaw and blade holder without departing from the scope or spirit of the invention. For example, in the embodiment of the invention described herein, the shoe is an integral structure. It will be recognized that the arch and shoe plate of the shoe may be separate components of the same or different materials in alternate embodiments. It will be further recognized that the holder need not be plug-shaped or fit within a cavity per se. It is sufficient to practice the invention to have a member which removably receives saw attachments and is removably attached to the saw at any convenient location.

What is claimed is:

1. In an electric jigsaw including a motor housing having an operative end, and including a pivot arch, and a shoe plate, said arch being secured to said shoe plate and securing said shoe plate to said housing for relative pivotal movement of the housing and shoe plate about the longitudinal axis of the arch, the improvement comprising:

an cavity defined by said arch and said shoe plate, said cavity axially extending for substantially the length of said housing and being open at the axial end thereof remote from said operative end; and a plug removably disposed in the open axial end of said cavity, said plug including a plurality of axially-extending slots open into said cavity for removably receiving attachments for said saw.

2. An electric jigsaw comprising:

a motor housing having a base;

a shoe plate having front and rear ends and being disposed proximate said base;

an elongated arch having a generally C-shaped cross-section secured to said shoe plate between the front and rear ends thereof, said arch and shoe plate defining an axial cavity;

means on the base of said housing for movably securing said arch to said housing to permit relative pivtal movement of said shoe plate and said housing; and a plug of resilient material removably disposed in the rear end of said cavity, said plug including a plurality of axially-extending slots open at one end thereof for receiving one end of attachments for said saw, the other end of said attachments axially extending into said cavity.

3. The jigsaw as in claim 1 or 2, wherein said plug is formed of an elastomeric polymer.

4. The jigsaw as in claim 1 or 2, wherein said plug has a generally D-shaped cross-section and has one end frictionally retained in said cavity.

5. The jigsaw as in claim 4 wherein said slots are open at the one end of said plug and are closed at the other end of said plug and wherein said slots taper towards the closed end thereof to frictionally secure said attachments in said slots.

6. The jigsaw of claim 1 or 2, wherein one said slot removably receives a screw-driving device and the remainder of said slots removably receive blades for said jigsaw.

* * * * *